United States Patent
Lee et al.

(10) Patent No.: US 6,728,026 B2
(45) Date of Patent: *Apr. 27, 2004

(54) DYNAMICALLY TUNABLE OPTICAL AMPLIFIER AND FIBER OPTIC LIGHT SOURCE

(75) Inventors: Chang-Hee Lee, Taejon (KR); Byoung Yoon Kim, Mountain View, CA (US); Seok Hyun Yun, Santa Clara, CA (US); Hyo Sang Kim, Santa Clara, CA (US); Jin-Serk Baik, Kyungki-do (KR); Kun-Youl Park, Pusan (KR); Wayne V. Sorin, Mountain View, CA (US)

(73) Assignee: Novera Optics, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/942,457

(22) Filed: Aug. 29, 2001

(65) Prior Publication Data

US 2002/0071173 A1 Jun. 13, 2002

Related U.S. Application Data

(63) Continuation-in-part of application No. 09/508,736, filed as application No. PCT/KR98/00254 on Aug. 19, 1998.
(60) Provisional application No. 60/297,589, filed on Jun. 11, 2001, and provisional application No. 60/228,629, filed on Aug. 29, 2000.

(30) Foreign Application Priority Data

Jul. 14, 1998 (KR) .......................................... 98-28259

(51) Int. Cl.[7] .................................................. H01S 3/00
(52) U.S. Cl. ............................... 359/337.11; 359/337.5
(58) Field of Search .............................. 359/333, 341.1, 359/337.11, 337, 337.5

(56) References Cited

U.S. PATENT DOCUMENTS

| 4,068,191 A | 1/1978 | Zemon et al. |
| 4,781,425 A | 11/1988 | Risk et al. |
| 4,828,350 A | 5/1989 | Kim et al. |

(List continued on next page.)

FOREIGN PATENT DOCUMENTS

| EP | 0713273 A2 | 5/1996 |
| WO | WO 00/04613 A1 | 1/2000 |

OTHER PUBLICATIONS

T.A. Birks, P.S.J. Russell, and C.N. Pannell, "Low power acousto–optic device based on a tapered single–mode fiber," IEEE Photonics Technology Lett., vol. 6, No. 6, pp. 725–727 (Jun. 1994).

B.Y. Kim, et al., "All–Fiber Acousto–Optic Frequency Shifter," Optics Letters, vol. 11, No. 6, pp. 389–391 (Jun. 1986).

J. Frangen, et al., "Integrated Optical Acoustically Tunable Wavelength Filter," Electronic Letters, vol. 25, Iss. No. 23, pp. 1583–1584 (1989).

(List continued on next page.)

*Primary Examiner*—Mark Hellner
(74) *Attorney, Agent, or Firm*—Blakely, Sokoloff, Taylor & Zafman LLP

(57) ABSTRACT

An optical amplifier comprises a wavelength tunable filter, one or more optical gain stages, and a controller for controlling a spectral profile of the wavelength tunable filter in response to a measured spectral characteristic of the amplifier. The controller may also control gain of the gain stage(s). The controller determines the filter spectral profile necessary to obtain a desired amplifier spectral characteristic. The spectral characteristic may, for example, be a power spectral output of the amplifier or a gain profile of the amplifier. The amplifier may incorporate a dispersion compensator. The controller may control a spectral profile of the wavelength tunable filter and gain of the dispersion compensator. A tunable fiber light source is also described.

71 Claims, 13 Drawing Sheets

U.S. PATENT DOCUMENTS

| | | | |
|---|---|---|---|
| 4,832,437 A | | 5/1989 | Kim et al. |
| 4,915,468 A | | 4/1990 | Kim et al. |
| 4,971,417 A | | 11/1990 | Krinsky et al. |
| 5,007,705 A | | 4/1991 | Morey et al. |
| 5,022,732 A | | 6/1991 | Engan et al. |
| 5,278,686 A | | 1/1994 | Righetti et al. |
| 5,392,377 A | | 2/1995 | Auracher |
| 5,457,568 A | | 10/1995 | Jabobovitz-Veselka et al. |
| 5,524,118 A | | 6/1996 | Kim et al. |
| 5,708,736 A | | 1/1998 | Steinblatt |
| 5,739,945 A | * | 4/1998 | Tayebati .................... 359/291 |
| 6,021,237 A | | 2/2000 | Kim et al. |
| 6,038,359 A | | 3/2000 | Moslehi et al. |
| 6,151,157 A | * | 11/2000 | Ball et al. .................. 359/341 |
| 6,172,995 B1 | * | 1/2001 | Yang ............................. 372/6 |
| 6,195,200 B1 | * | 2/2001 | DeMarco et al. ........... 359/341 |
| 6,233,379 B1 | | 5/2001 | Kim et al. |
| 6,266,462 B1 | | 7/2001 | Kim et al. |
| 6,452,719 B2 | * | 9/2002 | Kinoshita .............. 359/337.12 |

OTHER PUBLICATIONS

A.M. Vengsarkar, et al., "Long–Period Fiber–Grating–Based Gain Equalizers," Optical Letters, vol. 21, No. 5, pp. 336–338 (1996).

F. Tian, et al., "Interchannel Interference in Multiwavelength Operation of Integrated Acousto–Optical Filters and Switches," Journal of Lightwave Technology, vol. 13, No. 6, pp. 1146–1154 (1995).

H.S. Kim, S.H. Yun, I.K. Hwang, and B.Y. Kim, "Single–mode–fiber acousto–optic tunable notch filter with variable spectral profile," Conference on Optical Fiber Communications, 1997 OSA Technical Digital Series, vol. 6, pp. 395–398 (Feb. 16–21, 1997).

* cited by examiner

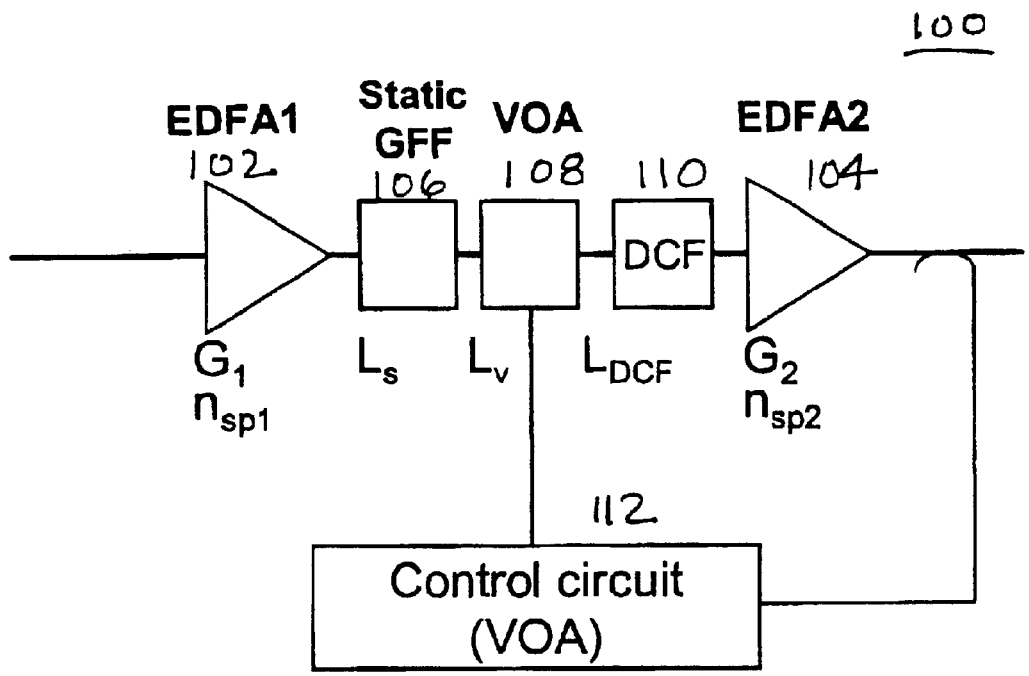
Fig. 1 AGC amplifier
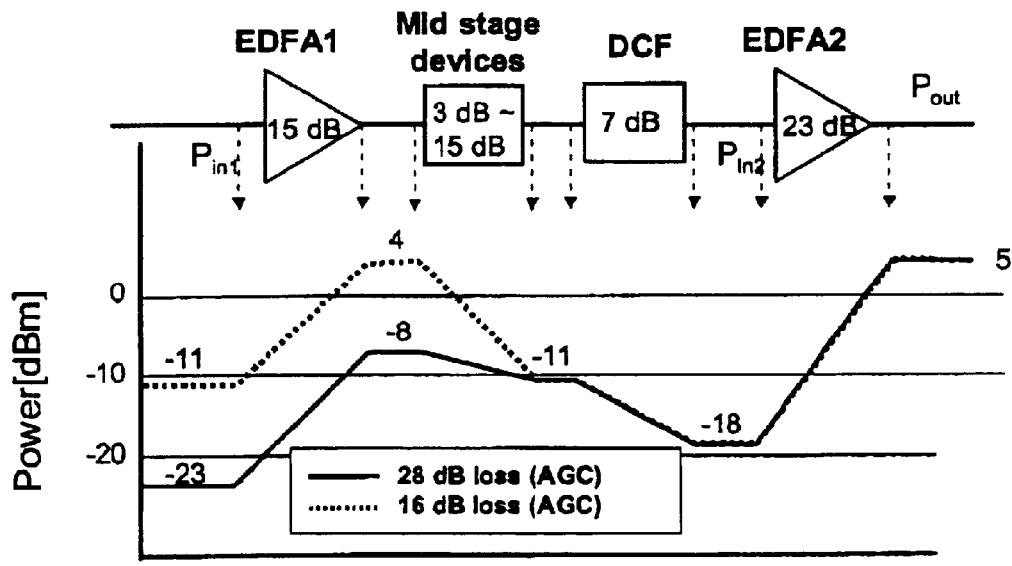
Fig. 2 Optical power evolution in the AGC amplifier

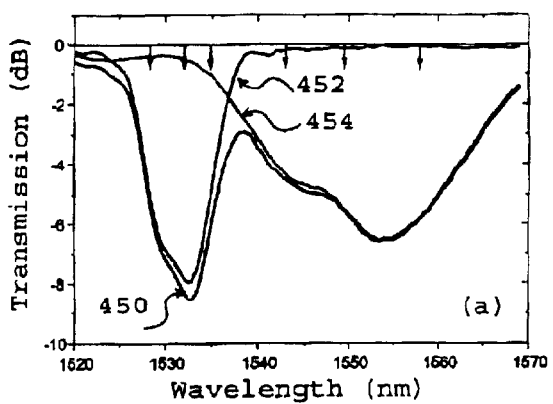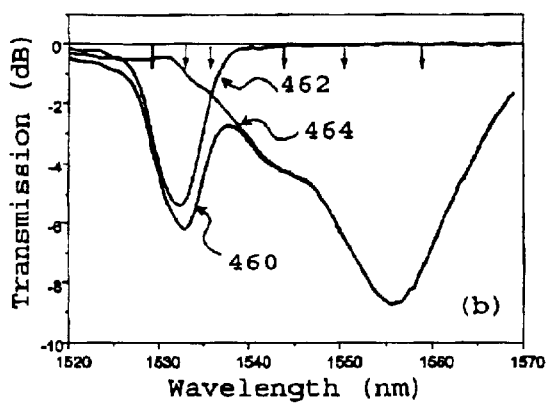
Fig. 6A                    Fig. 6B

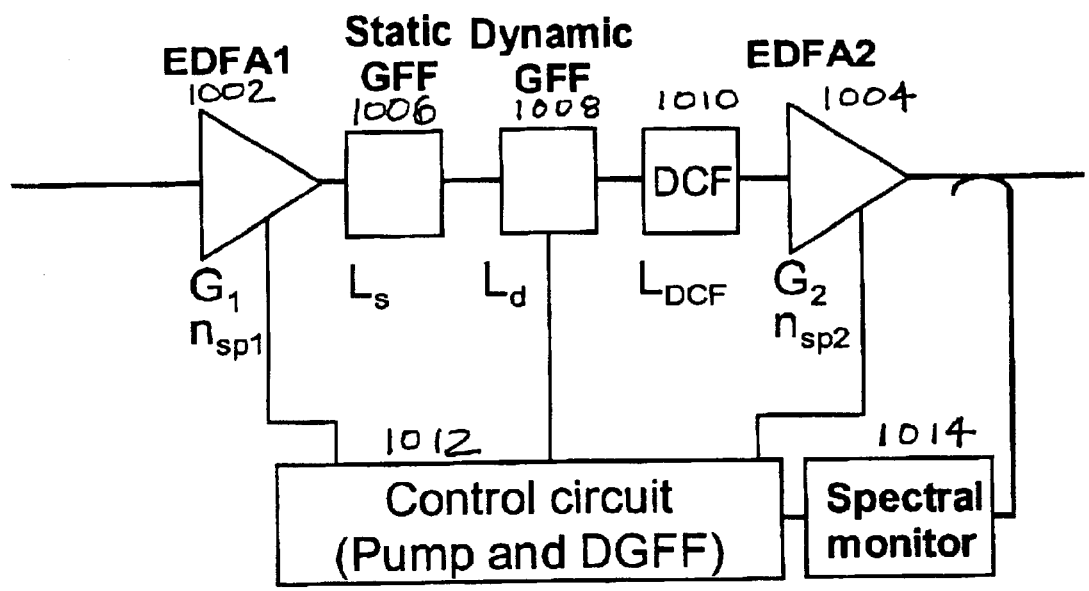
Fig. 10 APC amplifier
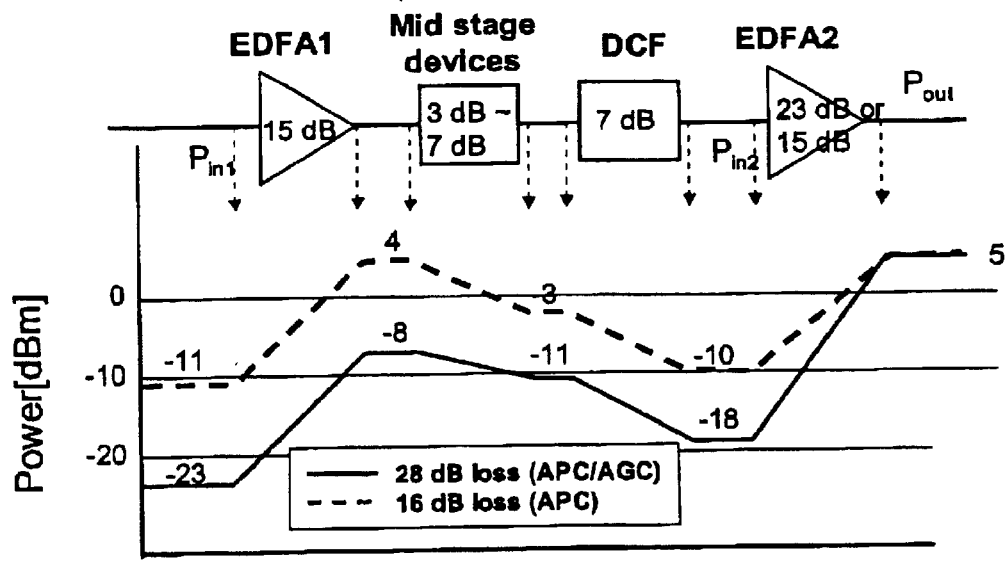
Fig. 11 Optical power evolution in the APC amplifier

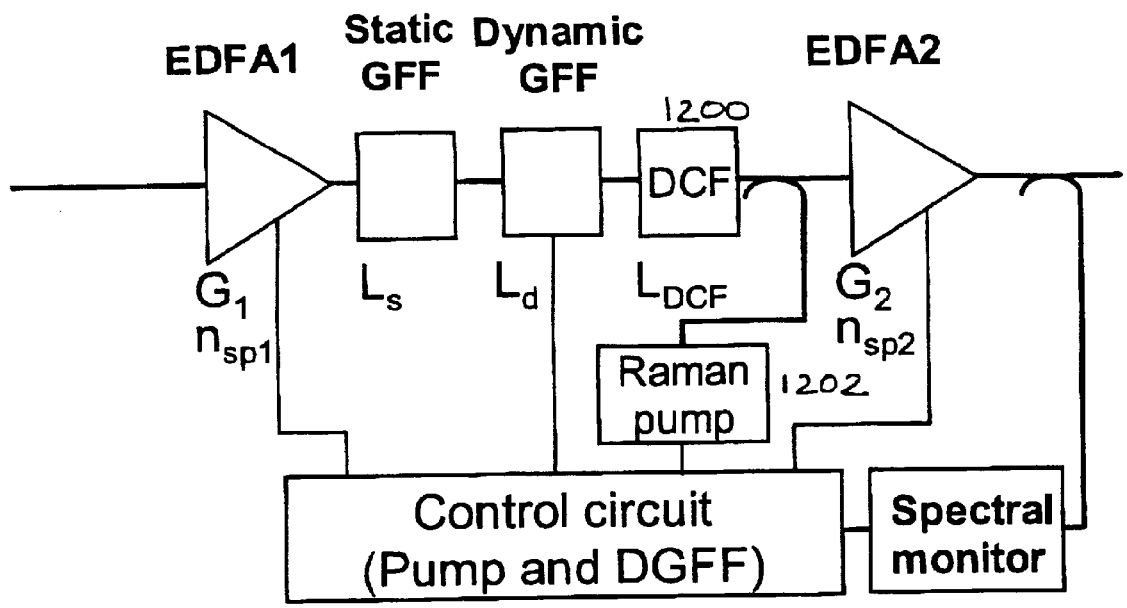
Fig. 12 APC amplifier with Raman gain in DCF
- Fiber loss : 0.2 dB/km ~ 0.28 dB/km
- Span length : 80 km ~ 100 km (span loss : 16 dB ~ 28 dB)
- DCF loss : 7 dB (in mid stage), Raman gain 7 dB
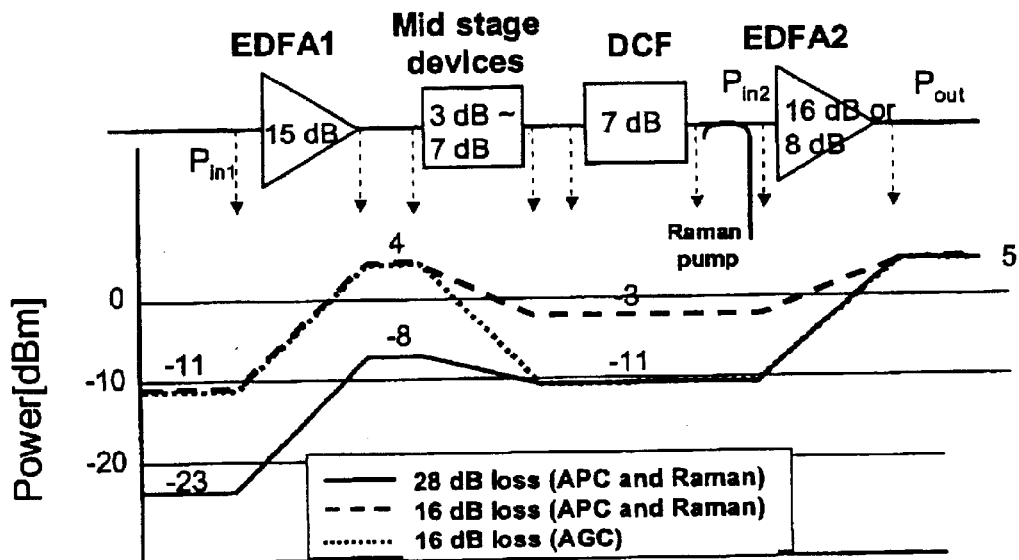
Fig. 13 Optical power evolution in the APC amplifier with Raman gain in DCF

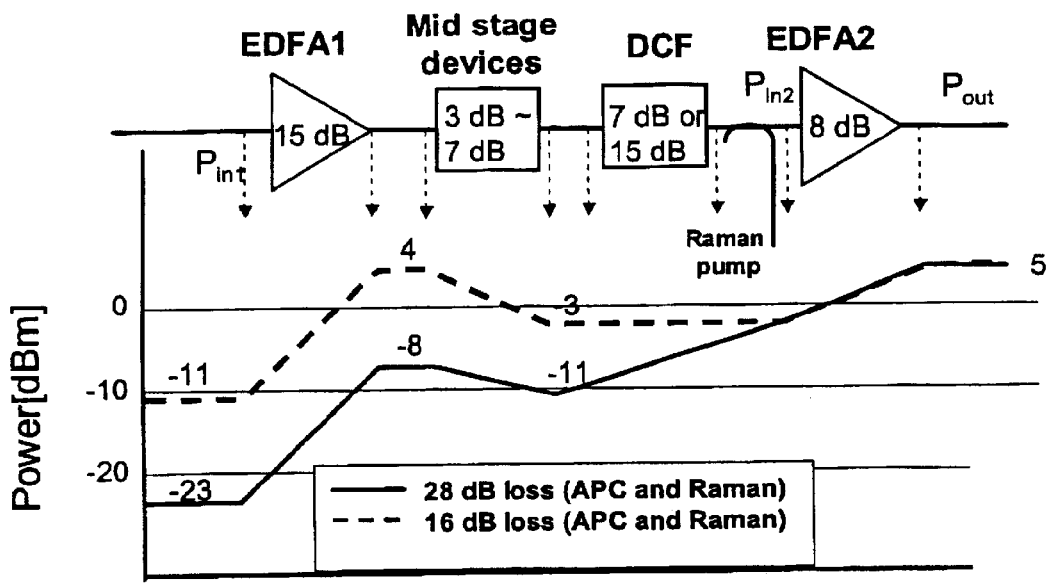
Fig. 14 Optical power evolution in the APC amplifier with Raman gain in DCF and fixed-gain first and second stage amplifiers

DYNAMICALLY TUNABLE OPTICAL AMPLIFIER AND FIBER OPTIC LIGHT SOURCE

CROSS-REFERENCE TO RELATED APPLICATIONS

This application claims the benefit under 35 U.S.C. §119 (e) of U.S. Provisional Application No. 60/297,589, filed Jun. 11, 2001, entitled "Automatic Power-Controlled Optical Amplifier with Dispersion Compensating Fiber," and U.S. Provisional Application No. 60/228,629, filed Aug. 29, 2000, entitled "Automatic Power Controlled Optical Amplifier for WDM Systems," and is a continuation-in-part of U.S. patent application Ser. No. 09/508,736, filed Jun. 2, 2000, entitled "Optical Amplifier with Actively Controlled Spectral Gain and Fiber Light Source with Desired Output Spectrum," which is the U.S. national stage application of International Application No. PCT/KR 98/00254, filed Aug. 19, 1998, which claims the benefit of South Korean Application Serial No. 1998-28259, filed Jul. 14, 1998, all of which are relied upon for priority for this application and all of which are hereby incorporated by reference herein.

FIELD OF INVENTION

The present invention relates to optical amplifiers for fiber optic networks, and, more particularly, to a dynamically tunable optical amplifier.

The present invention also relates to a light source, and, more particularly, to a tunable fiber light source.

BACKGROUND OF THE INVENTION

Optical networks in which the signals are wavelength division multiplexed ("WDM") require a uniform spectral distribution across all channels. As an optical signal traverses an optical network, however, the signal is subject to losses and nonlinear effects that result in signal attenuation and distortion. Therefore, amplifiers, such as erbium-doped fiber amplifiers ("EDFA's"), are typically placed approximately every 80 kilometers along an optical fiber to boost signal strength. However, such an amplifier has a non-uniform gain profile (as a function of wavelength), which, in turn, imposes a distortion on the signal power spectral distribution (as a function of wavelength). The gain profile of the optical amplifier changes as a function of the input power, as well. Optical amplifiers based on the Raman effect also exhibit spectral gain variations.

Static gain flattening filters ("SGFF's") are often used to attenuate the signal power as a function of wavelength to achieve a substantially uniform power distribution. Static filters (otherwise known as passive filters), however, cannot adapt to dynamically changing conditions such as amplifier aging, temperature variations, channel add/drop, fiber loss, amplifier gain profile variations due to input power variations, and other changes in components along the transmission line. Moreover, the required filter shape is dependent upon system configuration, e.g., the spacing between amplifiers. Static filter characteristics cannot be modified to compensate for these changes without replacing the filter itself.

An automatic gain control ("AGC") optical amplifier employs an SGFF, in conjunction with a variable optical attenuator ("VOA"), to achieve a constant gain profile over a wide spectrum. In these amplifiers, the output power per channel is proportional to optical input power, since the gain of the amplifier is a constant regardless of the input power to the amplifier.

FIG. 1 illustrates a typical configuration of an AGC amplifier 100 for WDM transmission systems and networks. It is a two-stage optical amplifier comprising, for example, two erbium-doped fiber amplifiers ("EDFA") EDFA1 102 and EDFA2 104. The first amplifier stage 102 (i.e., "gain stage") may be considered a pre-amplifier and the second 104 a post-amplifier. Those skilled in the art will recognize that other types of optical amplifiers known in the art, e.g., semiconductor optical amplifiers or Raman amplifiers, may also be used for the amplifier stages. Moreover, as is well known in the art, EDFA's and other amplifiers typically incorporate a pump laser (not shown). These amplifier stages have spectral transfer functions (otherwise known as transmission vs. wavelength profiles, gain profiles, or gain curves, among other terms) that are not uniform as a function of wavelength.

A static gain flattening filter 106, a variable optical attenuator 108, and a dispersion compensating fiber ("DCF") 110 are located between the two amplifier stages. Each stage of the optical amplifier provides a constant gain regardless of the input power to the amplifier. The constant gain can be maintained by changing the pump power for each amplifier stage as a function of the input power. Typically, the higher the input power, the higher the pump power that is required to maintain a constant gain. A higher pump power, however, causes a higher noise level within the amplifier stage.

At a particular gain level, each amplifier stage has a nonuniform spectral gain profile. The static gain flattening filter 106 is used to flatten the gain of the amplifier using a fixed gain profile based on the amplifier stages' known nonuniform gain profiles. The gain of each stage is kept constant because varying the gain would change the spectral profile, thereby requiring a different SGFF. Instead of varying the gain of the amplifier stages to maintain a constant output power per channel, a controller 112 of the AGC amplifier 100 varies the attenuation level of the VOA 108 to adjust the gain of the entire amplifier. The VOA attenuation level decreases/increases, when the input power decreases/ increases. In addition, the optical power into the DCF 110 should be less than −3 dBm/ch to avoid signal distortion due to optical nonlinearities in the DCF 110.

Although the AGC amplifier 100 can provide a constant output power for a wide range of input power, a drawback of the AGC amplifier is the large noise generated in the amplifier. To describe the loss contributors, consider, for example, an amplifier that has a range of gains from 16 dB (compensating an 80 km span of optical fiber having 0.2 dB/km loss) to 28 dB (compensating a 100 km span of optical fiber having 0.28 dB/km loss). The amplifier is designed to have a maximum 28 dB gain. The gain of the first stage amplifier 102, the insertion loss of the static gain flattening filter 106, the loss of the variable attenuator 108, the loss of the DCF 110, and the gain of the second stage amplifier 104 are 15 dB, 1 dB, 2 dB, 7 dB, and 23 dB, respectively.

FIG. 2 illustrates the power levels along the amplifier module 100. For a maximum gain of 28 dB, if one assumes that the output power per channel required of the amplifier is 5 dBm/ch, the input power of the first stage amplifier 102 is −23 dBm/ch, and that of the second stage amplifier 104 is −18 dBm/ch. Because the input power into the first stage amplifier 102 is much smaller that that of the second stage amplifier 104, the noise of the first stage amplifier 102 is dominant with respect to the output noise.

On the other hand, if the input power is −11 dBm/channel, then a gain of 16 dB is required to achieve the same output power per channel of 5 dBm/ch. In this case, the input power of the first stage amplifier 102 is −23 dBm/ch, and that of the second stage amplifier 104 is −18 dBm/ch. Because the gain of each amplifier stage is constant regardless of input power, the AGC amplifier requires that the loss of the variable attenuator 108 be increased to 14 dB to achieve the same output power. In this case, the noise of the amplifier is dominated by the noise generated from the second stage 104, if one assumes the same noise figure for the two amplifiers. In other words, the contribution of the second stage amplifier 104 to the output noise power is five times that of the first stage amplifier 102. Thus, the AGC amplifier provides a high noise figure when it is operated to have a wide gain dynamic range. The origin of the high noise figure is the large amount of attenuation induced by the variable optical attenuator 108 and the DCF 110. Note that the input power to the DCF 110 is −11 dBm/ch regardless of the input power to the optical amplifier.

The gain dynamic range of the amplifier is equal to the input power dynamic range, since the output power of the amplifier is desired to be constant. If one specifies an amplifier noise figure, the dynamic range of the AGC amplifier is limited. In other words, it is better to design a different amplifier for 16 dB gain, instead of using the amplifier designed for 28 dB gain with a 12 dB dynamic range. More generally, a different design of the AGC amplifier for a different gain is required for satisfactory noise performance.

It would be advantageous to provide an optical amplifier that can maintain a desired output power per channel and a desired gain profile over a wide dynamic range. It would also be advantageous to provide an optical fiber light source that can produce a desired output spectrum using similar technology.

SUMMARY OF THE INVENTION

The present invention provides an optical amplifier comprising a wavelength tunable filter, one or more optical gain stages, and a controller for controlling a spectral profile of the wavelength tunable filter in response to a measured spectral characteristic of the amplifier. The controller may also control gain of the gain stage(s). The controller determines the filter spectral profile necessary to obtain a desired amplifier spectral characteristic. The spectral characteristic may, for example, be a power spectral output of the amplifier or a gain profile of the amplifier. A monitor measures the spectral characteristic of the amplifier.

The wavelength tunable filter may include an acoustic wave exciter and an optical fiber having an interaction region. The acoustic wave exciter induces an acoustic wave in the interaction region to couple light between a first mode and a second mode, e.g., between core and cladding modes. The amplifier may also include a fixed optical filter having a fixed spectral profile.

In another embodiment, the amplifier may incorporate a dispersion compensator. The controller may control a spectral profile of the wavelength tunable filter and gain of the dispersion compensator. In addition, the controller may control gain of the gain stage(s), as well. The dispersion compensator may be a dispersion compensating fiber coupled to a pump laser, which is controlled by the controller.

According to similar principles, a fiber light source may include an optical fiber having a doped gain medium. An optical pump coupled to the fiber generates an amplified spontaneous emission in the fiber. A wavelength tunable filter controls the spectral shape of the amplified spontaneous emission.

BRIEF DESCRIPTION OF THE DRAWINGS

The present invention is illustrated by way of example and not limitation in the figures of the accompanying drawings, in which like references indicate similar elements and in which:

FIG. 1 illustrates an AGC amplifier.

FIG. 2 illustrates optical power evolution in the AGC amplifier.

FIGS. 6A and 6B illustrate filter loss curves for different saturation powers.

FIG. 10 illustrates yet another embodiment of a self-adjusting tunable amplifier of the invention.

FIG. 11 illustrates optical power evolution in the amplifier of FIG. 10.

FIG. 12 illustrates an APC amplifier with adjustable Raman gain in a dispersion compensating fiber.

FIG. 13 illustrates optical power evolution in the APC amplifier with adjustable Raman gain in the dispersion compensating fiber.

FIG. 14 illustrates optical power evolution in the APC amplifier with adjustable Raman gain in the dispersion compensating fiber and fixed-gain first and second stage amplifiers.

DETAILED DESCRIPTION

In the first set of embodiments, this application describes tunable optical amplifiers for WDM systems and networks, including self-adjusting dynamically tunable (automatic power-controlled ("APC™")) optical amplifiers. The APC amplifier is applicable to a wide range of gain (or span loss) without the addition of extra noise compared with the typical AGC amplifier.

The APC amplifier employs a wavelength tunable filter to achieve a desired spectral gain profile, e.g., a flat power spectrum. One example of a wavelength tunable filter is an all-fiber acousto-optic tunable filter ("AOTF"), as described in U.S. Pat. No. 6,266,462, entitled "Acousto Optic Filter," and incorporated by reference herein. An all-fiber AOTF may employ an acoustic wave exciter that coaxially surrounds a length of optical fiber. The acoustic wave exciter itself may include, for example, an RF signal generator, an acoustic wave generator, such as a PZT transducer, and an acoustic wave propagation member ("acoustic concentrator"), such as an aluminum horn (against the base of which is abutted the PZT transducer). An RF electrical signal applied to the PZT transducer generates an acoustic wave, which is focused onto the fiber by the horn. The acoustic wave induces a flexural wave in an unjacketed section (the "interaction region" or "interaction length") of the fiber.

Based upon the frequency of the acoustic wave, light at a particular optical center wavelength is coupled from one mode to another mode (e.g., core mode to cladding mode) in the interaction region of the fiber. The amount of light coupled at that optical wavelength (i.e., the conversion efficiency) depends upon the magnitude of the acoustic wave. This results in a notch in the transmission spectrum of the first mode (e.g., the core mode). By applying multiple RF signals to a single exciter, or by cascading multiple exciter/interaction region combinations each operating at one or more acoustic frequencies, the tunable filter may couple light at multiple optical wavelengths. The resulting combination of notches at different optical wavelengths and depths creates the transfer function (attenuation (gain) profile) of the filter.

Figure 3:
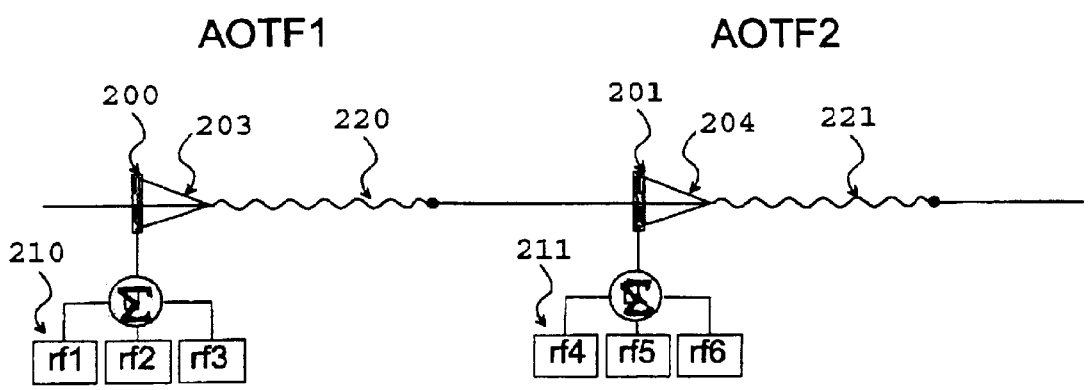
FIG. 3 illustrates a dual-AOTF wavelength tunable filter.

For example, the wavelength tunable filter may employ two acousto-optic tunable filters ("AOTF's") AOTF1 and AOTF2 connected in series, as shown in FIG. 3. The acoustic wave exciters of the AOTF's comprise piezoelectric transducers 200 and 201, and corresponding acoustic horns 203 and 204, respectively. The acoustic wave exciters are driven by alternating electrical signals from filter signal generator drivers 210 and 211. The generated acoustic wave propagates along the interaction lengths of single mode optical fibers 220 and 221. When the wavelength of the acoustic wave coincides with the beat length between modes, mode coupling is induced.

In this example, AOTF1 employs a telecommunication grade single mode fiber (NA=0.11, core diameter=9.2 microns, cladding diameter=125 microns). The acoustic wave propagates along an interaction length 220 of 15 cm in the fiber. Mode coupling from a core mode to the respective cladding modes (LP12, LP13, LP14) is achieved by applying three electrical signals generated from signal generators rf1, rf2 and rf3 210 to piezoelectric transducer 200. The half width half maxima of this filter are 3.3, 4.1 and 4.9 nm, respectively.

AOTF2 employs a single mode fiber with a cut-off wavelength of approximately 1 micron (NA=0.12, core diameter=7.0 microns, cladding diameter=100 microns). The interaction length 221 for inducing mode-coupling is 5 cm in this example. Mode coupling from a core mode to the respective cladding modes (LP11, LP12, LP13) is achieved by applying three electrical signals generated from signal generators rf4, rf5 and rf6 211 to piezoelectric transducer 201. The half width half maxima of this filter are 8.0, 8.6 and 14.5 nm, respectively.

The experimental data for the foregoing example is discussed below. Before turning to this data, however, those skilled in the art will recognize that AOTF2 may instead have characteristics identical to those of AOTF1. Moreover, rather than using six notches, the filter may employ any number of notches, e.g., eight notches. Also, as described above, rather than applying multiple frequencies to one acoustic concentrator horn, the amplifier could, for example, instead apply only one frequency to each horn in a series of horns, resulting in one notch per horn. To reduce polarization dependency, a Faraday rotating mirror/circulator combination may be employed, as described in U.S. Pat. No. 6,266,462, incorporated by reference herein.

The maximum response speed of the filter primarily depends on the length of interaction length of the optical fiber. For AOTF1 and AOTF2 in this example, the response times are 95 microseconds and 25 microseconds, respectively. AOTF1 with a narrow linewidth flattens the gain over the 1530 nm range, whereas AOTF2 with broad linewidth flattens the gain over the 1555 nm range. The basic optical loss of the two AOTF's due to the connection of the optical fibers is less than 0.5 dB.

Figure 4:
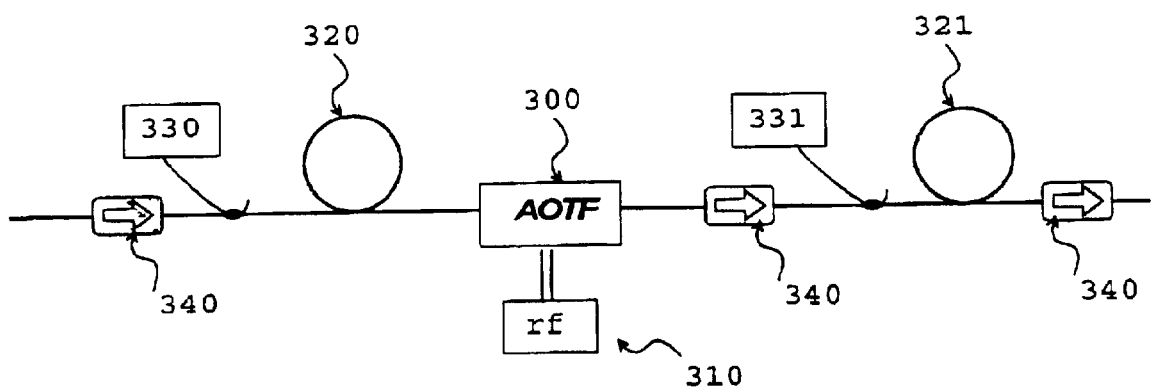
FIG. 4 illustrates a tunable optical amplifier employing the filter of FIG. 3.

FIG. 4 illustrates a unidirectional dual-stage optical amplifier employing a gain-flattening wavelength tunable filter 300 and signal generator 310, similar to that described in FIG. 3. Standard erbium doped fibers 320 and 321 and pump lasers 330 and 331, respectively, may be employed. In this example, optical fibers 320 and 321 doped with erbium of approximately 300 ppm concentration exhibit approximately 2.5 dB/m absorption at 1530 nm. The first stage optical fiber 320 (length: 10 m) is pumped with a 980 nm laser diode 330 to enhance noise characteristics. When a −10 dBm optical signal is pumped with 20 mW at 1550 nm, more than a 10 dB gain as well as more than a 4 dB noise figure is achieved.

The second stage optical fiber 321 (length: 24 m) is pumped with a 1480 nm laser diode 331. An optical isolator 340 is used to suppress backward spontaneous emission and the effect of reflected signals. The two optical fibers have different physical properties since at least one parameter of the optical fibers such as core radius, material, doping concentration or length is different. Instead of erbium doped optical fibers 320 and 321, optical fibers obtaining optical gain from the Raman nonlinear effect or semiconductor optical amplifying media may be used.

For experimental testing purposes a 1547.4 nm DFB (Distributed Feed Back) laser output and LED (Light Emitting Diode) output may be input to the optical amplifier as a saturating signal and a probe light, respectively. Gain and noise figure are measured by detecting the respective intensities of the amplified LED light and spontaneous emission using a wavelength analyzer. In a first test example, the input probe light power is −27 dBm over a range 1520 nm to 1570 nm, which is adjusted to be higher than that of spontaneous emission by more than 3 dB as well as much lower than that (−13~−7 dBm) of the DFB light in order to reduce measurement error.

Figure 5A:
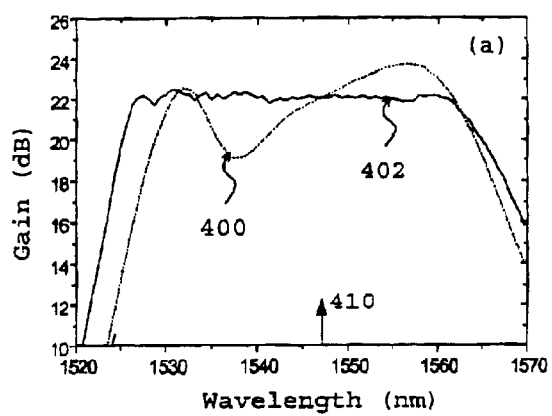
FIGS. 5A and 5B illustrate gain curves before and after gain flattening.

FIG. 5A illustrates spectral gain curves before and after gain flattening when the saturating signal (DFB light) power is −13 dBm. A gain curve 400 before gain flattening is obtained when electrical signals are not applied to the filter. On the other hand, a gain curve 402 after flattening is obtained by adjusting the loss (i.e., attenuation) curve of the filter to minimize spectral gain variation. In this example, the gain after gain flattening approaches a constant value (22 dB) over the 35 nm range between 1528 nm and 1563 nm. The arrow 410 represents the wavelength of the saturating signal.

Figure 5B:
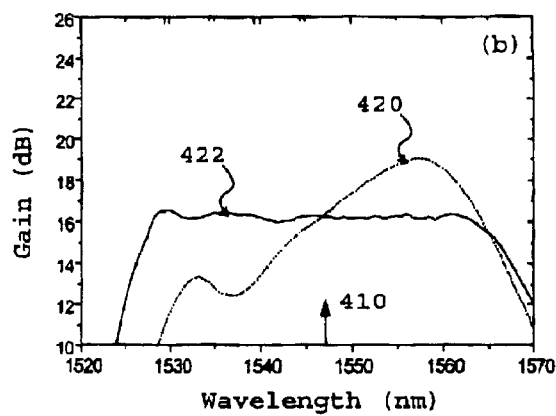

FIG. 5B illustrates gain curves 420 and 422 before and after gain flattening when the saturating signal power is −7 dBm. A 16 dB flat gain is obtained by adjusting the loss curve of the filter.

FIGS. 6A and 6B illustrate loss curves of the wavelength tunable filter for two different saturation powers of −13 dBm and −7 dBm, respectively. In FIG. 6A, the loss curves 452 and 454 produced by AOTF1 and AOTF2 of FIG. 3 are combined to form a total loss curve 450 on a log scale. Likewise, in FIG. 6B, the total curve 460 is formed from the loss curves 462 and 464.

As described above, AOTF1 and AOTF2 are used to flatten the gain over the 1530 nm and 1555 nm ranges, respectively. The six arrows in FIGS. 6A and 6B indicate the center wavelengths and applied voltages of the notches produced by six alternating RF electrical signals. In FIG. 6A, the frequency and voltage of the applied electrical signals are 2.0076 MHz, 10.04 V; 2.4015 MHz, 9.96 V; 2.9942 MHz, 23.2 V; 1.0277 MHz, 15 V; 1.5453 MHz, 9 V; and 2.3357 MHz, 17.2 V, when measured with an output impedance of 50 ohms. In FIG. 6B, those values are 2.0078 MHz, 4.74 V; 2.3989 MHz, 7.58 V; 2.9938 MHz, 14.02 V; 1.0348 MHz, 20.02 V; 1.5391 MHz, 13.2 V; and 2.3375 MHz, 15.8 V. If the efficiency of the acoustic wave exciter is enhanced and an optical fiber having a smaller diameter is employed, the drive voltage can be lowered.

The tunable optical amplifier according to the present invention can be used to obtain a desired gain curve under various operating conditions, unlike the conventional passive optical amplifier (SGFF). In the following experiment demonstrating advantages of the amplifier of the invention, the loss curve of the filter and the pumping power for the second stage optical fiber were adjusted to obtain a 19 dBm flat gain when the saturating signal power was −10 dBm.

Figure 7A:
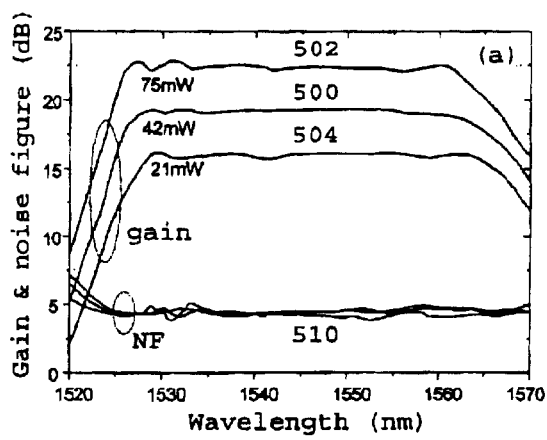
FIGS. 7A and 7B illustrate a flattened gain curve in response to filter adjustment, and gain tilt in response to no filter adjustment, respectively.

FIG. 7A shows flattened gain curves at various operating gain levels of the optical amplifier according to the present invention, when the filter is adjusted. In contrast, FIG. 7B illustrates gain tilt when the filter is not adjusted.

Referring to FIG. 7A, the curve 500 is a flattened gain curve for a pumping power of 42 mW. In general, the pumping power and filter profile should be readjusted to change the gain of the optical amplifier. The curves 502 and 504 are flattened gain curves obtained when the pumping powers are 75 mW and 21 mW, respectively, and the filter profiles are adjusted to reach gain levels of 22.5 dB and 16 dB, respectively. The noise figures 510 are less than 5 dB over the 35 nm range between 1528 nm and 1563 nm.

An optical amplifier employing this filter with an actively tunable loss curve can produce flattened gain profiles at various gain levels. However, an optical amplifier employing a conventional SGFF can produce flattened gain profiles only at one specific gain level.

Figure 7B:
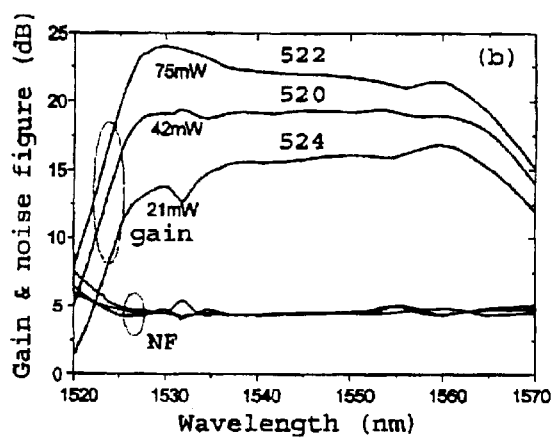

FIG. 7B shows an experimental result demonstrating this problem. In the experiment, the filter was adjusted to obtain a flattened 19 dB gain at a pumping power of 42 mW. The pumping power was increased to 75 mW without changing the loss curve of the filter. The gain 522 increased on the whole, but a gain variation of 3 dB was observed over the 35 nm range. When the pumping power was decreased to 21 mW, the gain 524 decreased with a gain variation of about 4 dB. These gain tilts exhibit one disadvantage of an optical amplifier employing an SGFF.

Figure 8:
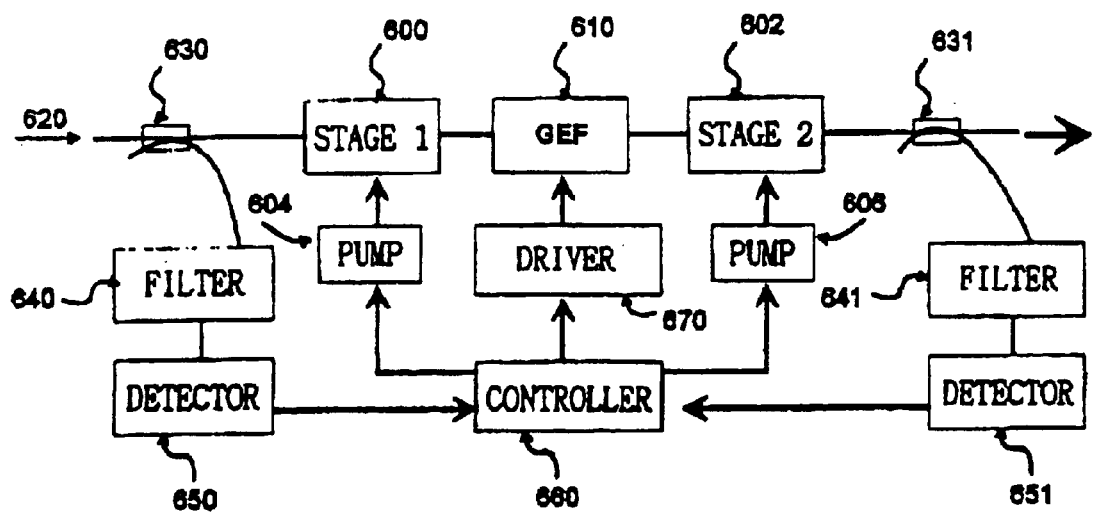
FIG. 8 illustrates a self-adjusting tunable amplifier of the invention.

FIG. 8 illustrates a self-adjusting optical amplifier according to an embodiment of the present invention. Self-adjusting dynamically-controllable amplifiers are also described in U.S. patent application Ser. No. 09/508,736 (International Application no. PCT/KR 98/00254), entitled "Optical Amplifier with Actively Controlled Spectral Gain and Fiber Light Source with Desired Output Spectrum," invented by B. Y. Kim, et al., and in U.S. patent application Ser. No. 60/228,629, entitled "Automatic Power Controlled Optical Amplifier for WDM Systems," invented by Chang-Hee Lee, et al, both of which are incorporated by reference herein.

In this embodiment, an optical gain detection system detects the gain of the optical amplifier by comparing the spectrum of input light to that of output light. First and second stage amplifiers comprise pumping lasers 604 and 606, WDM couplers 630 and 631, and erbium doped optical fibers 600 and 602. An active wavelength tunable filter (e.g., gain flattening or gain equalization filter) 610 having a desired loss curve is disposed between optical fibers 600 and 602. Along with active wavelength tunable filter 610, a passive wavelength filter having a specific loss curve may be used for a variety of purposes.

The operation of the gain detection system is as follows. Some part of incoming multi-wavelength optical signals 620 are input to a wavelength filter 640, such as a rotatable diffraction grating and a Fabry-Perot filter, by a fiber coupler 630. The fiber coupler 630 has a low wavelength dependence as well as low coupling ratios of less than a few percent. An optical detector 650 measures the optical signal intensity as a function of wavelength while the wavelength filter 640 is tunably swept.

The optical signals amplified at the first and second stage amplifiers are transmitted through a fiber coupler 631 and a wavelength filter 641 to an optical detector 651 for the detection of signal intensities as a function of wavelength. Filter 641 and detector 651 together act as a spectral monitor. The fiber coupler 631 also has a low wavelength dependence as well as low coupling ratios of approximately a few percent.

In one embodiment, a gain curve is obtained by comparing the measured input and output signal intensities. From a comparison of the measured gain curve with a desired gain curve, a controller 660 calculates the required pumping power and filter profiles. The respective pumping lasers 604, 606 and filter driver 670 are controlled according to the calculation results. Through the feedback of the controller 660, an active and intelligent optical amplifier, capable of obtaining a desired gain curve in spite of changes in external conditions, with a response time less than 1 ms, can be realized.

Figure 9:
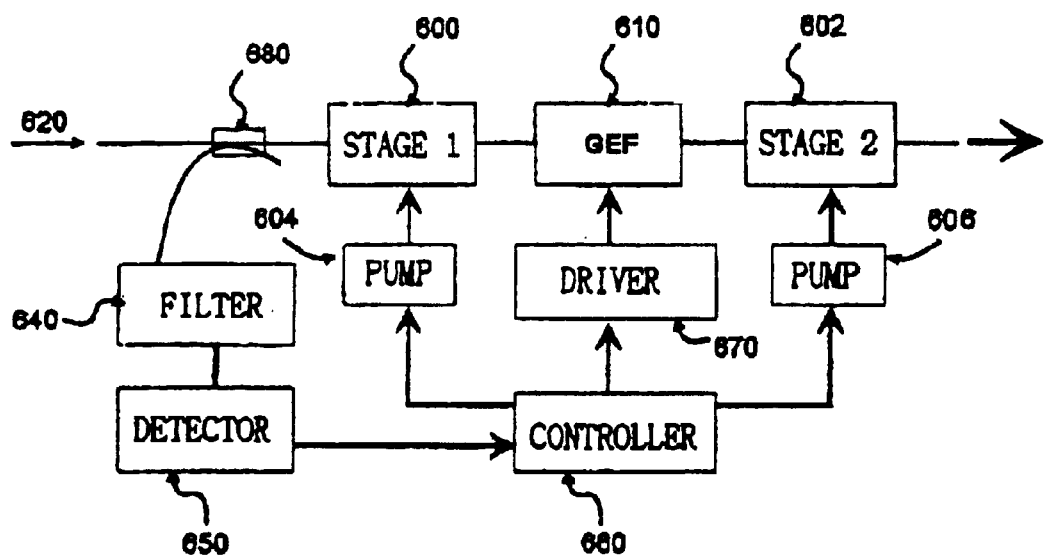
FIG. 9 illustrates another embodiment of a self-adjusting tunable amplifier of the invention.

FIG. 9 illustrates an active and intelligent optical amplifier according to another embodiment of the present invention. This embodiment employs an optical gain detection system different from the optical gain detection system described above in the manner of obtaining the gain curve of the optical amplifier. The spectrum of the backward spontaneous emission is obtained after transmitting light through an optical coupler 680 at the input port and a wavelength filter 640 to an optical detector 650. The gain curve of the optical amplifier can be obtained from the spectrum and a well-known amplifier modeling formula. Then, a controller 660 calculates the required pumping power and filter profiles from the comparison of the gain curve with a desired gain curve. The respective pumping lasers 604, 606 and filter driver 670 are controlled according to the calculation results, as was described in the previous embodiment.

The gain detection systems of FIGS. 8 and 9 may include a thermometer for detecting the temperature inside the optical amplifier. By virtue of feedback control, the amplifier can compensate for temperature changes to obtain a desired gain curve regardless of the temperature dependence of the erbium doped fiber, the wavelength tunable filter and other components.

FIG. 10 illustrates another embodiment of a self-adjusting APC amplifier of the invention employing a dynamically tunable optical filter and a dispersion compensator. The APC amplifier of FIG. 3 comprises two amplifier stages 1002 and 1004, a static gain flattening filter 1006, a wavelength tunable filter 1008 (e.g., a dynamic gain flattening filter), a dispersion compensator 1010 (e.g., a dispersion compensating fiber), a controller 1012 (e.g., controller hardware, software or a combination thereof), and a spectral monitor 1014. A small portion of the optical input power of the optical amplifier is tapped and provided to the controller 1012 to monitor total power into the optical amplifier. A small portion of the output signal is tapped to permit measurement of the spectrally-resolved output power by the spectral monitor 1014.

This configuration allows the controller 1012 to compare the measured spectrally-resolved output power to the desired output power to obtain an error signal. From the error signal, the controller calculates (1) the attenuation level (as a function of wavelength) and the center wavelength of the wavelength tunable filter 1008 (e.g., dynamic gain flattening filter) and (2) the pump power for each amplifier stage necessary to achieve the desired output power spectrum. Thus, the output power per channel of the entire amplifier module is adjusted by changing the pump power and the attenuation level.

In one example, to control the pump power, the controller 1012 compares the total measured output power with the total target output power to obtain a power error signal. The controller first adjusts the pump power of the second stage amplifier 1004 to minimize the power error (e.g., to zero error). If this adjustment does not achieve the desired minimum, then the controller 1012 also adjusts the pump power of the first-stage amplifier 1002 to reduce the power error.

To control the attenuation level and center wavelength of the wavelength tunable filter 1008, the controller 1012 compares the output spectrum measured by the monitor 1014 to a desired target spectrum to obtain a measure of the spectral error. The controller 1012 employs a curve fitting algorithm to adjust the center frequencies and depths of the filter notches to minimize the spectral error. Such curve fitting algorithms include, for example, the Simplex minimization algorithm, the Levenberg-Marquardt algorithm, and the reflective Newton method. The spectral attenuation profile of a single-notch wavelength tunable filter or its approximation is used as a base function for the curve fitting algorithm. (Note that, in another embodiment, the controller may adjust both the filter profile and gain together to further refine minimization of each of the errors, i.e., adjust both parameters to minimize the power error, and adjust both to minimize the spectral error.)

After the controller 1012 minimizes the spectral error as a result of the first iteration, it attempts to reduce the power error further based on a new power error measurement. After doing so, the controller 1012 then iteratively repeats attempts to minimize spectral error and power error until those errors are within acceptable tolerances. Those skilled in the art will recognize that many different well-known algorithms may be employed to minimize these errors.

Based on the foregoing, the APC amplifier of FIG. 10 can maintain the output power of the amplifier as a constant, regardless of the amplifier input power and input spectrum. Although this application focuses on achieving a flat power spectrum, the APC amplifier may be employed to achieve a target output spectrum of any shape. The amplifier can, for example, provide a positive or negative gain tilt in the output spectrum. Those skilled in the art will also recognize that the APC amplifier with an adjustable-gain DCF may also include a monitor to monitor input power, so that the controller can operate to achieve a desired spectral gain profile of the amplifier.

The APC amplifier of FIG. 10 achieves a constant output power over a wide spectral range by changing the gain of the amplifier without using a variable optical attenuator. Unlike the AGC amplifier, the APC amplifier allows the gain of the amplifier stages to vary. When the optical amplifier gain is changed, the gain profile of the amplifier changes. This variation can be compensated by using the wavelength tunable filter (e.g., dynamic gain flattening filter), which provides tunable attenuation over a wide bandwidth. By allowing the gain stages to vary, the amplifier maintains a high input power to the second stage amplifier. The addition of noise from the second stage is negligible.

To explain the operation of the APC amplifier, assume an APC amplifier with the same design parameters as the AGC amplifier. As shown in FIG. 11, the gain of the first stage amplifier 1002, the loss of the dynamic gain flattening filter 1008 including the static gain flattening filter 1006, the loss of the DCF 1010, and the gain of the second stage amplifier 1004 are 15 dB, 3 dB, 7 dB, and 23 dB, respectively, when the APC amplifier gain is 28 dB. In this case, the performance of the AGC and APC amplifiers is the same.

When the gain changes to 16 dB, the gain of the first stage amplifier 1002, the loss of the dynamic gain flattening filter 1008 including the static gain flattening filter 1006, the loss of the DCF 1010, and the gain of the second stage amplifier 1004 are 15 dB, 3 dB, 7 dB, and 15 dB, respectively. Then, the input power of the first stage amplifier is −11 dBm/ch, and that of the second stage amplifier is −10 dBm/ch. The input power of the second stage amplifier can be compared with the −18 dBm/ch input power of the AGC amplifier. For the APC amplifier, the input power to the second stage amplifier is higher than that of the first stage amplifier regardless of the amplifier gain. Thus, the noise characteristic of the amplifier is mainly determined by the first stage amplifier and the contribution of the second stage is relatively small. Consequently, the APC amplifier can be used for 16 dB gain and 28 gain with satisfactory noise performance.

Depending on the design of the amplifier, the first stage gain of the amplifier can be changed. For example, the gains of the amplifier are 15 dB and 27 dB when the input power is −11 dBm/ch and −23 dBm/ch, respectively. In this case, the gain of the second stage amplifier is almost constant.

Although the APC amplifier provides good noise performance within a wide dynamic range as compared to the AGC amplifier, the noise figure of the amplifier increases about 3 dB when the input dynamic range is 12 dB. The origin of the increase of the noise figure is the limitation of input power to the DCF (−3 dBm) in order to avoid distortion.

The APC amplifier of another embodiment of the present invention, as shown in FIG. 12, overcomes this problem by controlling the gain of the dispersion compensator. (Except where otherwise understood, the components in this figure are similar to those in FIG. 10.) The dispersion compensator may, for example, be implemented as a dispersion compensating fiber 1200 coupled to a Raman pump source 1202. By controlling the Raman gain in the DCF 1200, the amplifier module can increase the input power to the second stage amplifier. This example illustrates a Raman pump source 1202 that propagates counter-directionally to the signal within the DCF 1200. Those skilled in the art will recognize that the present invention may employ different amplifier configurations and techniques to increase gain at the dispersion compensation stage under the control of the controller.

In this embodiment, to achieve a desired total output power, the controller may adjust the second gain stage, then the first gain stage, then the DCF Raman pump 1202 to minimize the power error. Those skilled in the art will recognize that this order may be varied. As before, the controller varies the attenuation level of the tunable filter (e.g., DGFF) to achieve a desired spectral profile. In another embodiment, the gain stages may be fixed, in which case the controller may control only the DCF Raman pump 1202 to achieve a desired total output power.

FIG. 13 illustrates the optical power distribution when the Raman gain is 7 dB, i.e., the Raman gain compensates the DCF loss. In this case, the gain of the first stage amplifier, the loss of the dynamic gain flattening filter including the static gain flattening filter, the loss of the DCF, and the gain of the second stage amplifier are 15 dB, 3 dB, 7 dB, and 16 dB, respectively, when the APC amplifier gain is 28 dB. Because the Raman gain is 7 dB, the input power to the second stage amplifier is −11 dBm/ch.

When the amplifier gain changes to 16 dB, the gain of the first stage amplifier, the loss of the dynamic gain flattening filter including the static gain flattening filter, the loss of the DCF, and the gain of the second stage amplifier are 15 dB, 3 dB, 7 dB, and 8 dB, respectively. The Raman gain of the DCF is 7 dB. The input power of the first stage amplifier is −11 dBm/ch, and that of the second stage amplifier is −3 dBm/ch. Thus, the input power to the second stage amplifier is higher than that of the first stage amplifier regardless of the amplifier gain. Consequently, the contribution of the second gain stage is negligible, and the noise characteristic of the amplifier is determined by the first stage amplifier. Accordingly, the APC amplifier with the adjustable-gain DCF can be employed over a dynamic range from 16 dB gain to 28 dB.

If gain control of the DCF were applied to the AGC amplifier (in which the amplifier stages maintain a constant gain), the performance would not be changed when the gain of the amplifier is 28 dB. However, when the amplifier gain is set to 16 dB, the input power to the second stage amplifier is −11 dBm/ch, instead of −3 dBm/ch for the APC amplifier in this invention. Thus, the noise performance of the APC amplifier of FIG. 12 is much better than that of the AGC amplifier.

The superior performance of the APC amplifier of FIG. 12 is made possible by controlling the Raman pump power. In this case the first (15 dB) and second stage (8 dB) amplifiers operate in a manner similar to an AGC amplifier, since the change of the Raman gain absorbs the span loss change. When the gain of the amplifier is 28 dB, the losses of the midstage devices are 3 dB and the Raman gain of the DCF is 15 dB. When the gain of the amplifier is 16 dB, the losses of the midstage devices are 7 dB and the Raman gain of the DCF is 7 dB. FIG. 14 illustrates the power evolution for this case. The dynamic gain flattening filter compensates gain spectrum changes in the Raman amplifier due to changes in the gain. In this way, the APC of FIG. 12 can maintain output gain flatness and constant output power (or any desired output spectrum) within a wide dynamic range without increasing the noise.

In another embodiment employing multiple pumps for the Raman gain, the amplifier can dynamically change gain and gain shape of the Raman amplifier by controlling the pump powers, where each pump operates at a different wavelength. This characteristic can be used to obtain a desired output power per channel from the amplifier in conjunction with the dynamic tuning characteristics of the gain flattening filter. For example, the amplifier can generate positive or negative gain tilt in the Raman gain spectrum. The gain tilt can partially compensate the gain tilt in the EDFA. The DGFF can then be used for fine (as opposed to coarse) flattening. In this manner, the amplifier can reduce the load on the DGFF. This is advantageous because, as the load on the DGFF increases, certain types of losses (e.g., polarization dependent loss) increase, thereby increasing the system penalty.

Figure 15:
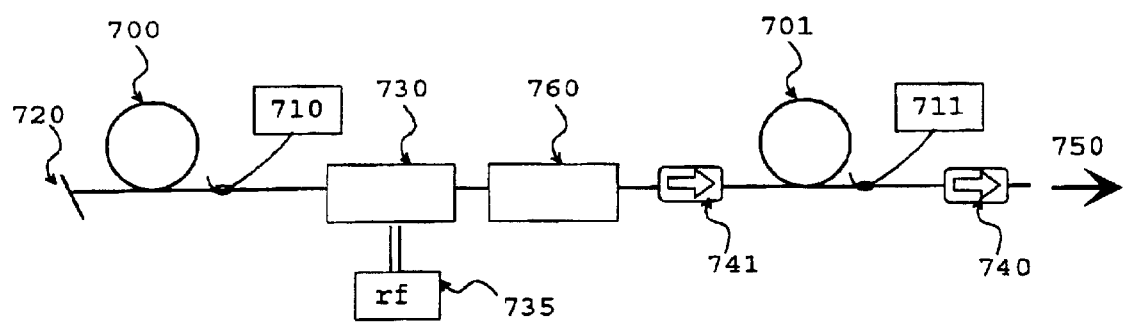
FIG. 15 illustrates a tunable fiber light source of the invention.

Using principles similar to those described above, FIG. 15 illustrates a fiber light source according to the other aspect of the present invention. The fiber light source can actively produce optical output spectra using the amplified spontaneous emission ("ASE") generated from a pumped gain optical fiber without external input optical signals. By employing an erbium doped optical fiber, the tunable fiber light source can achieve an output spectrum with a broad bandwidth of more than 30 nm at a 1550 nm center wavelength.

The gain optical fiber is divided into two parts, similar to the above-described dual-stage optical amplifier. A first stage optical fiber 700 and a second stage optical fiber 701 are pumped contra-directionally by optical pumps 710 and 711, respectively, to increase the optical power. An end 720 of the first stage optical fiber 700 is cut at an angle to reduce reflectance. The other end of the first stage optical fiber 700 is connected to one end of the second stage optical fiber 701 through a wavelength tunable filter 730. The other end of the second stage optical fiber 701 is connected to an optical isolator 740 to avoid optical feedback from the ambient environment. Along with wavelength tunable filter 730, a mid-stage optical isolator 741 is installed to remove the backward amplified spontaneous emission traveling from the first stage to the second stage, enhancing the power of the forward optical output 750. If necessary, an additional fixed wavelength filter 760 can be installed to obtain a variety of output spectra. For example, if a Fabry-Perot filter having a free spectral range of 0.8 nm or 1.6 nm and a finesse of more than 10 is used as fixed wavelength filter 760, spectrum-sliced output light, adequate for the light source of WDM optical communication systems, can be obtained. Moreover, the desired optical power for each wavelength channel of the spectrum-sliced output spectrum can be obtained by adjusting a filter driver 735. For example, if the optical loss or gain in an interconnected communication system is different for each channel, signal to noise characteristics for each channel can be optimized by adjusting the optical power for each channel of the light source. That is, higher optical power may be supplied for a channel of high optical loss and lower optical power for a channel of low optical loss, respectively.

Figure 16:
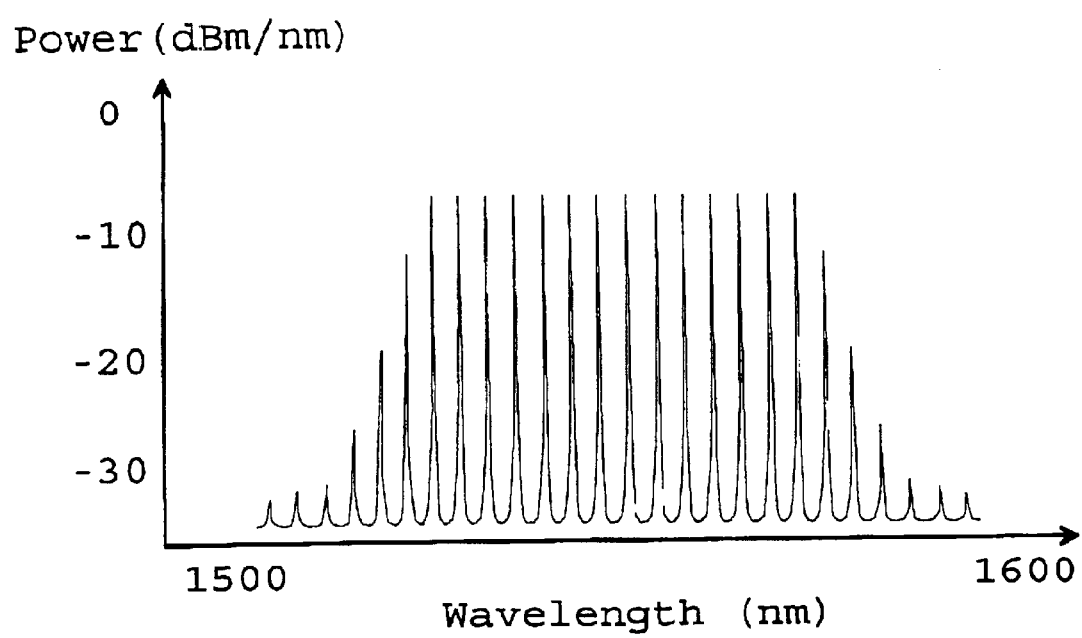
FIG. 16 illustrates a spectral output of the fiber light source.

FIG. 16 is a graph showing a representative spectrum of the spectrum-sliced optical output generated from the fiber light source of the invention. The optical power for each channel is flattened over a few tens of nanometer wavelength range.

The above-described active optical amplifier provides control over the amplifier spectral profile under changing conditions in WDM optical communication systems. For example, a constant gain level can be obtained in spite of changes in surrounding temperature, the spectrum hole-burning effect resulting from the changes in optical input power, or the like.

In an optical transmission line including a plurality of amplifiers, active optical amplifiers may be used for all the amplifiers. Alternatively, active optical amplifiers may be positioned between passive optical amplifiers along the line. Moreover, the active amplifier may be used as a front-stage amplifier between a light source and an optical transmission line when the optical transmission line shows wavelength-dependent irregular optical loss or gain. In this case, signal to noise characteristics for each wavelength can be optimized by adjusting the optical power of the light input to the optical transmission line, for each wavelength at the front-stage amplifier. That is, low-power light is input to the optical transmission line for wavelengths showing unacceptable optical loss. Conversely, high power light may be input by the amplifier to the optical transmission line for wavelengths showing low optical loss.

The fiber light source according to another aspect of the invention can produce a desired output spectrum while actively coping with changes in external conditions. Therefore, it can be used in a fiber-optic gyroscope, a white-light interferometer, or for characteristic analysis of devices used in WDM optical communication systems. Moreover, the spectrum-sliced light source with periodic transmittance can be used as a light source for WDM optical communication systems. In that case, the wavelength-dependent optical loss in the optical transmission line is compensated by controlling the optical power of each wavelength channel to a desired state to yield an optimal signal-to-noise ratio.

In the foregoing specification, the invention has been described with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical amplifier comprising:
   a wavelength tunable filter;
   at least one optical gain stage;
   a controller for controlling gain of the at least one gain stage and a spectral profile of the wavelength tunable filter in response to a measured spectral characteristic of the amplifier.

2. The optical amplifier of claim 1, wherein the spectral characteristic is a power spectral output of the amplifier.

3. The optical amplifier of claim 1, wherein the spectral characteristic is a gain profile of the amplifier.

4. The optical amplifier of claim 1, further comprising:
   a monitor for measuring the spectral characteristic of the amplifier, wherein the controller determines the filter spectral profile necessary to obtain a desired amplifier spectral characteristic.

5. The optical amplifier of claim 4, wherein the monitor measures the amplifier spectral characteristic by measuring a backward amplified spontaneous emission spectrum of the optical amplifier.

6. The optical amplifier of claim 1, the wavelength tunable filter comprising:
   an acoustic wave exciter;
   an optical fiber having an interaction region,
   wherein the acoustic wave exciter induces an acoustic wave in the interaction region to couple light between a first mode and a second mode.

7. The optical amplifier of claim 6, wherein the optical fiber has a core and a cladding, and the first mode is a mode in the core and the second mode is a mode in the cladding.

8. The optical amplifier of claim 6, wherein the filter comprises at least two types of optical fibers differing in at least one of the following parameters selected from the group consisting of core radius, cladding radius and refractive index.

9. The optical amplifier of claim 6, wherein the wavelength of the acoustic wave generated in the wavelength tunable filter has a value in the 10 micron–10 mm range.

10. The optical amplifier of claim 1, wherein the wavelength tunable filter is a dynamic gain flattening filter.

11. The optical amplifier of claim 1, wherein the at least one gain stage comprises:
    an optical waveguide having a gain medium therein; and
    a pump coupled to the waveguide to pump the gain medium.

12. The optical amplifier of claim 11, wherein the gain medium is selected from the group consisting of an optical fiber doped with rare earth ions, an optical fiber obtaining gain from the Raman nonlinear effect, and a semiconductor optical amplifying medium.

13. The optical amplifier of claim 11, wherein the gain medium is an erbium-doped optical fiber, and the pump is a semiconductor laser.

14. The optical amplifier of claim 11, wherein the gain medium comprises at least two types of optical fibers differing in at least one of the following parameters selected from the group consisting of core radius, material, doping concentration, and length.

15. The optical amplifier of claim 1, further comprising a fixed optical filter having a fixed spectral profile.

16. The optical amplifier of claim 1, the controller including:
    a temperature detector for measuring temperature inside the optical amplifier, wherein the controller controls the wavelength tunable filter and the at least one gain stage to compensate for changes in the gain profile of the gain medium and in the spectral profile of the wavelength tunable filter due to the temperature changes.

17. The optical amplifier of claim 1, further comprising at least one optical isolator.

18. An optical amplifier comprising:
    a wavelength tunable filter, including an acoustic wave exciter and an optical fiber having an interaction region, wherein the acoustic wave exciter causes coupling of light between a core mode and a cladding mode in the interaction region, the transmission of light in the core mode representing a spectral profile of the filter;
    at least one optical gain stage;
    a controller for controlling the spectral profile of the wavelength tunable filter in response to a measured spectral characteristic of the amplifier.

19. The optical amplifier of claim 18, wherein the controller also controls the at least one gain stage in response to the measured spectral characteristic of the amplifier.

20. The optical amplifier of claim 18, wherein the spectral characteristic is a power spectral output of the amplifier.

21. The optical amplifier of claim 18, wherein the spectral characteristic is a gain profile of the amplifier.

22. An optical amplifier comprising:
    at least one optical gain stage;
    a wavelength tunable filter;
    a dispersion compensator; and
    a controller for controlling a spectral profile of the wavelength tunable filter and gain of the dispersion compensator.

23. The optical amplifier of claim 22, wherein the wavelength tunable filter is an acousto-optic tunable filter.

24. The optical amplifier of claim 23, the wavelength tunable filter comprising:
    an acoustic wave exciter;
    an optical fiber having an interaction region,
    wherein the acoustic wave exciter induces an acoustic wave in the interaction region to couple light between a first mode and a second mode.

25. The optical amplifier of claim 24, wherein the optical fiber has a core and a cladding, and the first mode is a mode in the core and the second mode is a mode in the cladding.

26. The optical amplifier of claim 22, wherein the controller also controls the at least one gain stage.

27. The optical amplifier of claim 26, wherein the at least one gain stage includes two gain stages.

28. The optical amplifier of claim 22, wherein the wavelength tunable filter is a dynamic gain flattening filter.

29. The optical amplifier of claim 22, wherein the dispersion compensator is a dispersion compensating fiber coupled to a pump laser, and the controller controls the pump laser.

30. The optical amplifier of claim 29, wherein the pump laser is a Raman pump laser.

31. The optical amplifier of claim 30, wherein the Raman pump laser is a combination of pump lasers operating at different wavelengths.

32. The optical amplifier of claim 30, wherein the controller controls Raman gain tilt in the dispersion compensating fiber.

33. The optical amplifier of claim 22, further comprising a fixed optical filter having a fixed spectral profile.

34. The optical amplifier of claim 33, wherein the fixed optical filter is a static gain flattening filter.

35. The optical amplifier of claim 22, wherein the controller is responsive to a spectral characteristic of the amplifier.

36. The optical amplifier of claim 35, further comprising a spectral monitor to provide the spectral characteristic of the amplifier.

37. The optical amplifier of claim 35, wherein the spectral characteristic is a power spectral output, and the controller controls the filter spectral profile and the gain of the dispersion compensator to achieve a desired power spectral output.

38. An optical amplifier comprising:
a first optical gain stage for amplifying an optical signal;
a dynamic gain flattening filter optically coupled to the first gain stage, wherein the filter includes an optical fiber having an interaction region, the filter coupling light between a core mode and a cladding mode in the interaction region;
a dispersion compensating fiber optically coupled to the filter;
a second optical gain stage optically coupled to the dispersion compensating fiber; and
a controller, responsive to a spectral characteristic of the amplifier, for controlling gain of at least one of the gain stages, a spectral profile of the filter, and gain of the dispersion compensating fiber.

39. The optical amplifier of claim 38, wherein the spectral characteristic is a power spectral output of the amplifier, and the controller operates to achieve a desired power spectral output.

40. A fiber light source, comprising:
an optical fiber having a doped gain medium;
an optical pump coupled to the fiber for generating amplified spontaneous emission in the fiber; and
a wavelength tunable filter for controlling a spectral shape of the amplified spontaneous emission, wherein the wavelength tunable filter includes an acousto-optic tunable filter to dynamically generate the spectral shape of the amplified spontaneous emission.

41. The fiber light source of claim 40, further comprising a fixed filter having a fixed spectral profile.

42. The fiber light source of claim 41, wherein the fixed filter is a Fabry-Perot filter, the free spectral range of the Fabry-Perot filter being narrower than the full-width half-maximum of the amplified spontaneous emission so that the output light has an evenly spaced wavelength-sliced spectral shape.

43. The fiber light source of claim 42, wherein the free spectral shape has a value selected from the group consisting of 0.4 nm, 0.8 nm, and 1.6 nm.

44. A method for wavelength-tunably amplifying an optical signal in an optical amplifier, the method comprising:
amplifying an input optical signal;
tunably filtering the optical signal;
measuring a spectral characteristic of the optical amplifier; and
controlling the amplifying and filtering in response to the measured spectral characteristic to obtain a desired spectral characteristic.

45. The method of claim 44, wherein the spectral characteristic is a power spectral output of the amplifier.

46. The method of claim 44, wherein the spectral characteristic is a gain profile of the amplifier.

47. The method of claim 44, the measuring comprising measuring the spectral characteristic by measuring a backward amplified spontaneous emission spectrum of the amplifier.

48. The method of claim 44, the tunably filtering comprising:
inducing an acoustic wave in an interaction region of an optical fiber to couple light between a first mode and a second mode.

49. The method of claim 48, wherein the optical fiber has a core and a cladding, and the first mode is a mode in the core and the second mode is a mode in the cladding.

50. The method of claim 48, wherein the wavelength of the acoustic wave has a value in the 10 micron–10 mm range.

51. The method of claim 44, wherein the filtering comprises dynamic gain flattening.

52. The method of claim 44, wherein the amplifying comprises pumping a gain medium in an optical waveguide.

53. The method of claim 52, wherein the gain medium is selected from the group consisting of an optical fiber doped with rare earth ions, an optical fiber obtaining gain from the Raman nonlinear effect, and a semiconductor optical amplifying medium.

54. The method of claim 52, wherein a semiconductor laser pumps an erbium-doped optical fiber gain medium.

55. The method of claim 44, further comprising filtering the optical signal with a fixed optical filter having a fixed spectral profile.

56. The method of claim 52, the controlling including controlling the amplifying and tunable filtering to compensate for changes due to temperature.

57. A method for wavelength-tunably amplifying an optical signal in an optical amplifier, the method comprising:
amplifying an input optical signal;
tunably filtering the optical signal by acoustically inducing coupling of light between core and cladding modes in an interaction region of an optical fiber;
measuring a spectral characteristic of the optical amplifier; and
controlling the filtering in response to the measured spectral characteristic to obtain a desired spectral characteristic.

58. The method of claim 57, the controller further comprising controlling the amplifying in response to the measured spectral characteristic of the amplifier.

59. The method of claim 57, wherein the spectral characteristic is a power spectral output of the amplifier.

60. The method of claim 57, wherein the spectral characteristic is a gain profile of the amplifier.

61. A method for wavelength-tunably amplifying an optical signal in an optical amplifier, the method comprising:

amplifying an input optical signal;

compensating for dispersion of the optical signal with a dispersion compensator having a gain;

tunably filtering the optical signal;

measuring a spectral characteristic of the optical amplifier; and controlling the tunable filtering and the gain of the dispersion compensator in response to the measured spectral characteristic to obtain a desired spectral characteristic.

62. The method of claim 61, the tunable filtering comprising inducing an acoustic wave in an interaction region of an optical fiber to couple light between a first mode and a second mode.

63. The method of claim 62, wherein the optical fiber has a core and a cladding, and the first mode is a mode in the core and the second mode is a mode in the cladding.

64. The method of claim 61, the controlling further comprising controlling the amplifying.

65. The method of claim 61, the tunable filtering comprising dynamic gain flattening.

66. The method of claim 61, wherein the dispersion compensator is a dispersion compensating fiber coupled to a pump laser, and the controlling controls the pump laser.

67. The method of claim 61, further comprising filtering the optical signal with a fixed optical filter having a fixed spectral profile.

68. The method of claim 61, the spectral characteristic being a power spectral output, wherein the tunable filtering and the gain of the dispersion compensator are controlled to achieve a desired power spectral output.

69. A method for generating light from an optical, comprising:

generating light from amplified spontaneous emission in a doped gain medium of a first fiber;

pumping a second fiber having a doped gain medium contra-directionally to the first fiber; and tunably filtering the light to control the spectral shape of the amplified spontaneous emission.

70. The method of claim 69, further comprising filtering the light with a fixed filter having a fixed spectral profile.

71. The method of claim 69, wherein the fixed filter is a Fabry-Perot filter, the free spectral range of the Fabry-Perot filter being narrower than the full-width half-maximum of the amplified spontaneous emission so that the output light has an evenly spaced wavelength-sliced spectral shape.

* * * * *